(12) United States Patent
Einsiedel et al.

(10) Patent No.: US 7,775,549 B2
(45) Date of Patent: Aug. 17, 2010

(54) ROOF-LINING MODULE

(75) Inventors: Heinrich Einsiedel, Ulm (DE); Jürgen Völk, Langenau (DE); Peter Baumgartner, Günzburg (DE); Markus Leifheit, Bieberbach/Affalten (DE)

(73) Assignee: Takata - Petri AG, Aschaffenburg (DE)

( * ) Notice: Subject to any disclaimer, the term of this patent is extended or adjusted under 35 U.S.C. 154(b) by 0 days.

(21) Appl. No.: 11/902,507

(22) Filed: Sep. 21, 2007

(65) Prior Publication Data

US 2008/0073887 A1 Mar. 27, 2008

Related U.S. Application Data

(63) Continuation of application No. PCT/EP2006/002929, filed on Mar. 21, 2006.

(30) Foreign Application Priority Data

Mar. 22, 2005 (DE) .................. 10 2005 014 087

(51) Int. Cl.
*B60R 21/213* (2006.01)
(52) U.S. Cl. .................. 280/728.2; 280/730.2
(58) Field of Classification Search ............. 280/728.2, 280/730.2; *B60R 21/213*
See application file for complete search history.

(56) References Cited

U.S. PATENT DOCUMENTS

| | | | |
|---|---|---|---|
| 5,294,414 A | 3/1994 | Brede et al. | |
| 5,921,575 A * | 7/1999 | Kretschmer et al. | 280/728.2 |
| 5,988,735 A | 11/1999 | Müller | |
| 6,070,902 A | 6/2000 | Kowalski et al. | |
| 6,073,961 A * | 6/2000 | Bailey et al. | 280/730.2 |
| 6,079,732 A * | 6/2000 | Nakajima et al. | 280/728.2 |
| 6,079,735 A | 6/2000 | Fallmann et al. | |
| 6,082,761 A * | 7/2000 | Kato et al. | 280/730.2 |
| 6,102,435 A | 8/2000 | Wallner et al. | |
| 6,103,984 A * | 8/2000 | Bowers et al. | 280/730.2 |
| 6,135,491 A * | 10/2000 | Olson et al. | 280/730.2 |
| 6,152,485 A * | 11/2000 | Kato | 280/749 |
| 6,168,186 B1 * | 1/2001 | Welch et al. | 280/728.2 |
| 6,173,990 B1 * | 1/2001 | Nakajima et al. | 280/730.2 |
| 6,224,087 B1 | 5/2001 | Stütz et al. | |
| 6,257,616 B1 | 7/2001 | Nowak et al. | |
| 6,302,434 B2 * | 10/2001 | Nakajima et al. | 280/730.2 |
| 6,364,349 B1 * | 4/2002 | Kutchey et al. | 280/730.2 |
| 6,412,810 B1 | 7/2002 | Wipasuramonton et al. | |
| 6,435,544 B1 * | 8/2002 | Brucker | 280/730.2 |
| 6,485,048 B2 * | 11/2002 | Tajima et al. | 280/728.2 |

(Continued)

FOREIGN PATENT DOCUMENTS

DE 39 32 576 A1 4/1991

(Continued)

*Primary Examiner*—Paul N Dickson
*Assistant Examiner*—Laura Freedman
(74) *Attorney, Agent, or Firm*—Foley and Lardner LLP (57) ABSTRACT

The disclosed roof-lining module is used for installation in a motor vehicle. The roof-lining module comprises a roof-lining covering for covering an inside of a motor vehicle roof skin, wherein a side of the roof-lining faces the vehicle floor; and an airbag module secured on the roof-lining covering with at least one gas generator. The gas generator extends longitudinally over at least a partial region of the roof-lining covering.

19 Claims, 8 Drawing Sheets

U.S. PATENT DOCUMENTS

| | | | |
|---|---|---|---|
| 6,523,887 B1* | 2/2003 | Picken et al. | 296/214 |
| 6,540,287 B2* | 4/2003 | Luik et al. | 296/214 |
| 6,616,222 B1* | 9/2003 | Ponceau | 296/214 |
| 6,702,320 B1 | 3/2004 | Lang et al. | |
| 6,736,421 B2* | 5/2004 | Blake et al. | 280/730.2 |
| 6,755,438 B2 | 6/2004 | Rink et al. | |
| 6,793,241 B2* | 9/2004 | Wallner et al. | 280/730.2 |
| 6,913,280 B2* | 7/2005 | Dominissini et al. | 280/728.2 |
| 7,011,337 B2* | 3/2006 | Aoki et al. | 280/730.2 |
| 7,017,942 B2* | 3/2006 | Elqadah et al. | 280/730.2 |
| 7,172,209 B2* | 2/2007 | Totani et al. | 280/728.2 |
| 7,246,817 B2* | 7/2007 | Tanase | 280/730.2 |
| 2001/0022441 A1* | 9/2001 | Nakajima et al. | 280/730.2 |
| 2002/0017775 A1* | 2/2002 | Tanase et al. | 280/730.2 |
| 2002/0190507 A1* | 12/2002 | Sante et al. | 280/730.2 |
| 2002/0190508 A1* | 12/2002 | Jost | 280/730.2 |
| 2003/0195685 A1 | 10/2003 | Mori et al. | |
| 2004/0256843 A1* | 12/2004 | Totani et al. | 280/730.2 |
| 2005/0052001 A1 | 3/2005 | Totani et al. | |

FOREIGN PATENT DOCUMENTS

| | | |
|---|---|---|
| DE | 41 38 988 A1 | 6/1992 |
| DE | 296 03 316 U1 | 8/1996 |
| DE | 297 05 489 U1 | 9/1997 |
| DE | 196 12 229 A1 | 10/1997 |
| DE | 196 32 222 A1 | 2/1998 |
| DE | 198 48 794 A1 | 5/1999 |
| DE | 198 38 451 A1 | 10/1999 |
| DE | 199 32 949 A1 | 2/2000 |
| DE | 100 39 800 A1 | 2/2002 |
| DE | 202 07 788 U1 | 11/2002 |
| DE | 203 00 254 U1 | 6/2003 |
| DE | 203 08 759 U1 | 11/2003 |
| DE | 202 15 541 U1 | 3/2004 |
| DE | 10 2004 022 793 A1 | 12/2004 |
| DE | 103 52 385 A1 | 6/2005 |
| EP | 0 480 085 A1 | 4/1992 |
| EP | 1 202 880 B1 | 11/2003 |
| WO | WO 98/42548 | 10/1998 |
| WO | WO 2004/101327 A1 | 11/2004 |

* cited by examiner

ROOF-LINING MODULE

This application is a continuation of International Application PCT/EP2006/002929, which has an international filing date of Mar. 21, 2006; this International Application was published in English as WO 2006/100113 A1, and which claims priority to German Application DE 10 2005 014 087.4, filed Mar. 22, 2005, all of which are incorporated herein by reference in their entireties.

BACKGROUND

The present application relates to a roof-lining module and to a method for installing a module in a motor vehicle.

DE 202 07 788 U1 discloses a side airbag module which has a receiving body, an inflatable gas bag arranged in the receiving body and a gas generator which is fastened to the receiving body and is intended for inflating the gas bag. In this case, the side airbag module, in particular the head airbag module, together with a roof-lining covering for covering the motor vehicle roof skin which faces the vehicle floor forms a pre-assembled, independent subassembly, so that the subassembly can be mounted in a motor vehicle as a complete unit. To receive the side airbag module, the roof-lining covering has a receiving region which, in a fitted state, i.e. in a state of the subassembly in which it is mounted in the motor vehicle, extends from the A-pillar to the C-pillar of the motor vehicle along an edge of the roof-lining covering running in a direction oriented parallel to the vehicle longitudinal axis.

The aforementioned head airbag module is arranged and fastened in this receiving region of the roof-lining covering, so that, in a fitted state of the subassembly, the gas generator is arranged centrally between the A- and C-pillars adjacent to the B-pillar in a direction running parallel to the vehicle longitudinal axis. In a pre-installation state of the subassembly, i.e. in a state before the subassembly is mounted in the motor vehicle, the gas generator is arranged centrally along the edge of the roof-lining covering. This arrangement may lead to problems during the transportation and during the installation on the vehicle frame.

Disclosed embodiments may be based in part on the problem of providing a roof-lining module and a method for installing an airbag module in a motor vehicle in which the airbag module and method for installing facilitate the handling of a roof-lining module and the process of assembling the roof-lining into a motor vehicle.

SUMMARY

According to one disclosed embodiment, a roof lining module is provided. The module is fitted into a motor vehicle and comprises: a roof-lining covering for covering an inside of the motor vehicle roof skin, whose side faces the vehicle floor; and an airbag module, in particular a side airbag module, secured on the roof-lining covering with at least one gas generator. The gas generator may be designed so that it extends longitudinally over at least a partial region of the roof-lining covering. This configuration does not prevent the gas generator from having one or more sections which protrude, for example in a bent-down manner, from the roof-lining covering. Such sections may project out of a module casing.

This configuration is advantageous, because the weight of the gas generator is distributed essentially uniformly along the partial region of the roof-lining covering, which decisively facilitates a guiding of the roof-lining module into a position ready for installation and the fitting of the roof-lining module.

In another disclosed embodiment of the module, the gas generator, extending longitudinally, runs along an edge of the roof-lining covering as part of the airbag module. The edge, in a fitted state of the roof-lining module, i.e. in a state of the roof-lining module in which it is fitted into the motor vehicle, preferably runs essentially in a direction oriented parallel to the vehicle longitudinal axis.

In this case, the gas generator is preferably arranged in a known gas lance which encases the gas generator, is designed such that it extends longitudinally, is part of the airbag module, and has known discharge openings for discharging a known flow medium.

In a disclosed embodiment a roof grab handle, as part of the roof-lining module, is already secured in the pre-installation state along the edge of the roof-lining covering. The airbag module is reliably pre-fixed on the roof grab handle, so that the airbag module, in the pre-installation state, is secured so that it remains in a predetermined position with respect to the roof grab handle and the roof covering during the transportation of the roof-lining module and, in particular, during the guiding of the roof-lining module into a position ready for installation.

The airbag module can preferably be fastened to a roof frame of the motor vehicle by the roof grab handle being fastened to the roof frame. In other words, a pre-fixing of the airbag module on the roof grab handle, which is fastened to the roof-lining covering, is designed so that, with the roof grab handle (and therefore the entire roof-lining module) being fastened to the roof frame, a final fixing between the airbag module and roof frame can also be produced. This configuration is advantageous, because a connection between the airbag module and the at least one roof grab handle only has to serve for the above-described (cost-saving) pre-fixing. Pre-fixing is therefore understood to mean a securing of the airbag module on a roof grab handle in a pre-installation state of the roof-lining module. The securing serves merely for a reliable fixing of the airbag module on the roof grab handle, for example, during the transportation or during an operation for installing the roof-lining module. The fastening of the airbag module to the roof frame takes place at the same time as, and by, the fastening of the roof grab handles to the roof frame.

The roof grab handle can preferably be fastened to at least one fastening region of the roof-lining covering, which is provided for it, by a first fastening means. The airbag module preferably is pre-fixable on the fastening region and/or the first fastening means by at least one retaining element in a pre-installation state of the roof-lining module.

In another disclosed embodiment, the retaining element has at least one loop which encircles the gas lance of the airbag module in a circumferential direction of the gas lance. This configuration is advantageous, because a connection of the retaining element to the gas lance can thereby be produced, thus the connection does not require an additional fastening means (for example recesses with a thread, etc.) formed on the gas lance. The loop through which the gas lance runs, or a free end protruding from the loop can preferably be fastened to the fastening region and/or to the first fastening means. In this connection, a second fastening means of which the roof-lining covering can be fastened to a roof frame of the motor vehicle in a fitted state of the roof-lining module is preferably arranged on the first fastening means.

In yet another exemplary embodiment, the second fastening means is formed by regions which protrude from the first fastening means and/or the retaining element and can be plugged into recesses of the roof frame, which are provided for them, in order to form a connection between the roof-lining module and the roof frame. This configuration is advantageous, because a frictional or bonding connection which can be implemented rapidly can thereby be realized.

In a further disclosed embodiment, a gas bag is provided as part of the airbag module and, in a folded state, is arranged at least partially along the gas lance. In particular, the gas bag can surround the gas lance so that the flow medium produced by the generator in the event of the airbag module being activated can pass through the discharge openings of the gas lance into the gas bag in order to inflate and to deploy the gas bag. In a region adjacent to the gas lance, the gas bag preferably has at least one first cutout through which the at least one retaining-element loop encircling the gas lance in the circumferential direction of the gas lance runs. Furthermore, the airbag module can have a module casing for receiving the gas generator, the gas lance and the gas bag in which the casing serves to protect those components of the airbag module.

In a further embodiment, the airbag module has at least one module end which protrudes from the roof-lining covering. This may be, for example, a module end which, in the fitted state of the roof-lining module, runs from the roof covering along the C-pillar. In the fitted state, the at least one module end can therefore be secured on the body of the motor vehicle, for example on a C-pillar of the motor vehicle.

The module end can preferably be folded onto the roof-lining covering in a pre-installation state of the roof-lining module and can be fixed releasably on the roof-lining covering for the transportation of the roof-lining module. The module end can thereby be protected in a pre-installation state against damage, for example during the transportation to an installation station.

In another exemplary embodiment, a protective covering is fitted onto the roof-lining covering as part of the roof-lining module, so that the protective covering together with the roof-lining covering forms a casing for receiving the side airbag module. This arrangement is advantageous, because a module casing for protecting the gas bag, the gas lance and the gas generator can therefore be omitted; as in this case, protection of the gas bag and of further components of the airbag module is ensured by the protective covering (and the roof-lining covering).

A method for installing an airbag module is also disclosed herein. The method comprises the steps of: providing a roof-lining covering; providing an airbag module with a gas generator extending longitudinally as part of the airbag module; pre-fixing the airbag module on the roof-lining covering, so that the gas generator extends longitudinally at least over a partial region of the roof-lining covering; and fastening the roof-lining covering to the vehicle body. The longitudinal extension of the gas generator over at least a partial region of the roof-lining covering does not prevent the gas generator from also being able to have bent-down sections protruding from the roof-lining covering.

Owing to the pre-fixing, this method permits a reliable bringing together of the airbag module with the roof-lining covering into a position ready for installation, for example, the installation on a roof frame or on the vehicle body. The longitudinal extension of the gas generator (as part of the airbag module) at least along a partial region of the roof-lining covering ensures an optimum balance of the roof-lining covering with the pre-fixed airbag module, which considerably facilitates the installation of the unit in the motor vehicle.

The method may provide that at least one grab handle is fastened along an edge of the roof-lining covering by a first fastening means. The airbag module is pre-fixed on the roof grab handle by at least one retaining element, so that the gas generator, extending longitudinally, is arranged along the edge of the roof-lining covering. The roof grab handle, and in the process the airbag module, is fastened to a roof frame of the motor vehicle by a second fastening means, so that the edge of the roof-lining covering extends along the roof frame. In this case, the pre-fixing serves merely to reliably secure the airbag module on the roof grab handle. The prefixing ensures, during the transportation of the roof-lining covering together with the pre-fixed airbag module, that the airbag-module position cannot be changed with respect to the roof-lining covering and can therefore be realized in a simple and cost-saving manner. The final fixing of the airbag module takes place, in particular, at the same time as the roof grab handles are fastened to the roof frame of the motor vehicle.

A protective covering is fitted on the roof-lining covering so that, during the pre-fixing, the airbag module is arranged at least partially between the roof-lining covering and the protective covering. This embodiment has the additional advantage that the airbag module and in particular the gas bag of the airbag module can be securely mounted and protected without the necessity of using a gas-bag packaging or module casing.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1A:
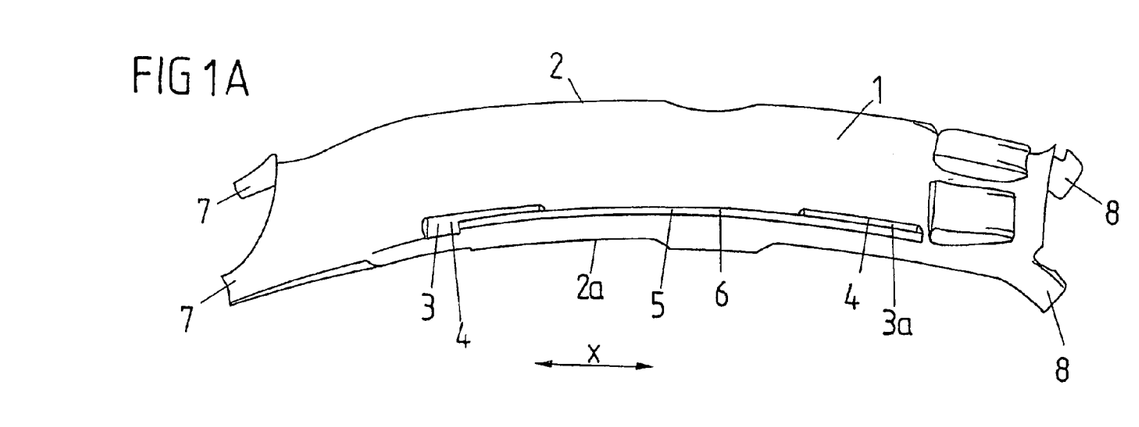
FIG. 1A is a front view of a roof-lining covering with a gas lance and a gas generator arranged therein.

FIG. 1A shows a perspective view of a roof-lining covering (or headliner) 1 which is of essentially planar, rectangular design and accordingly has four edges. Two of the four edges, in a fitted state of the roof-lining covering 1, run in a direction which is oriented parallel to the vehicle longitudinal axis X. Arranged along these two (mutually opposite) edges 2 and 2a are, in each case, two fastening regions 3 and 3a which are spaced apart from each other and are designed as troughs with an essentially rectangular rim (only two of the four fastening regions are illustrated in FIG. 1A) at which the roof grab handles 4 can be fastened to a lower side of the roof-lining covering 1, whose side, in the fitted state, faces the vehicle floor. The roof-lining covering 1 has a curvature in a direction pointing towards the vehicle floor in the fitted state of the roof-lining covering 1, with the result that the two edges 2 and 2a are likewise curved, corresponding to the curvature of the entire roof-lining covering 1, in a direction pointing towards the vehicle floor. Arranged along one edge 2a is a gas lance 5 which runs so that it extends longitudinally, is curved corresponding to the curvature of the edge 2a, has a circular cross section and surrounds a gas generator 6. The length of the gas generator 6 in the direction of the longitudinal extension of the gas lance 5 corresponds to the length of the gas lance 5 (as shown schematically in dashed lines) or to a part of the length of the gas lance 5. Gas generators of this type are known, for example, from EP 1 202 880 B1 and DE 203 08 759 U1.

The gas lance 5 (and the gas generator 6 arranged in it) extends along the edge 2a so that two end sections of the gas lance 5 (and of the gas generator 6) are arranged parallel and adjacent to the fastening regions 3 and 3a.

Furthermore, the roof-lining covering 1 has two free, first corner regions 7 and has two free, second corner regions 8. The free, first corner regions protrude from the roof-lining covering 1 in a direction oriented essentially parallel to the vehicle longitudinal axis X and, in a fitted state of the roof-lining covering 1, are bent down in the direction of the vehicle floor and are adjoined in each case by a covering (not shown) of a C-pillar. The free, second corner regions 8 protrude in an opposite direction and are likewise bent down in the direction of the vehicle floor and are adjoined (in a fitted state of the roof-lining covering 1) in each case by a covering of an A-pillar (not shown).

Figure 1B:
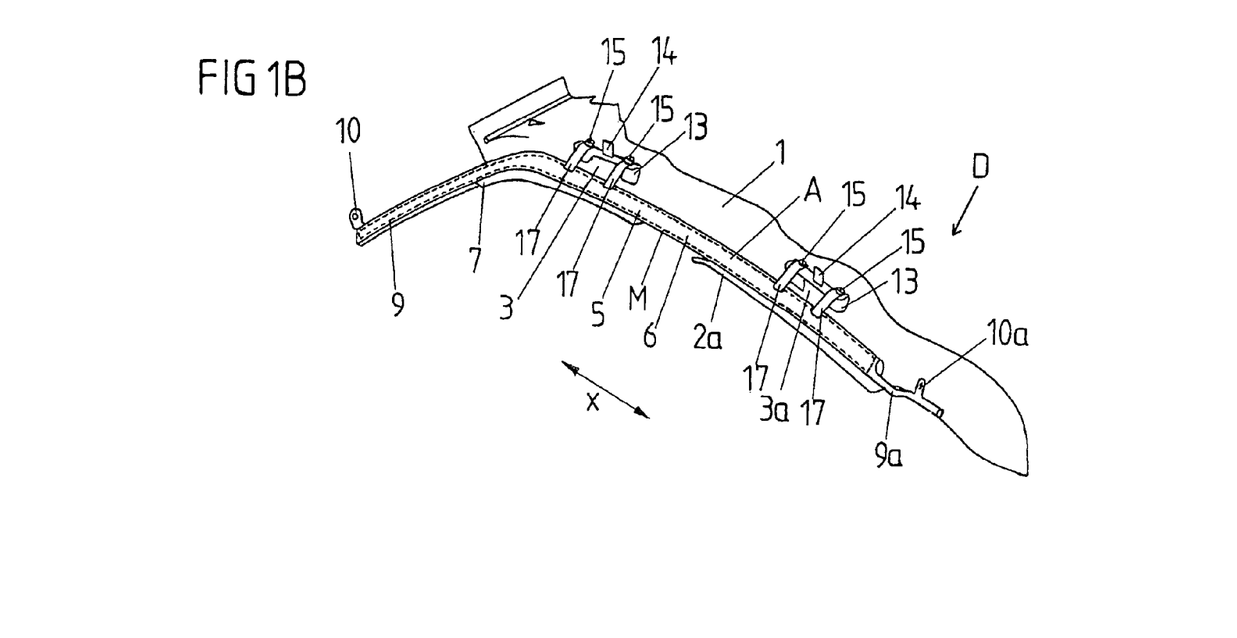
FIG. 1B is a perspective view of a roof-lining module with a roof-lining covering and an airbag module.
Figure 6:
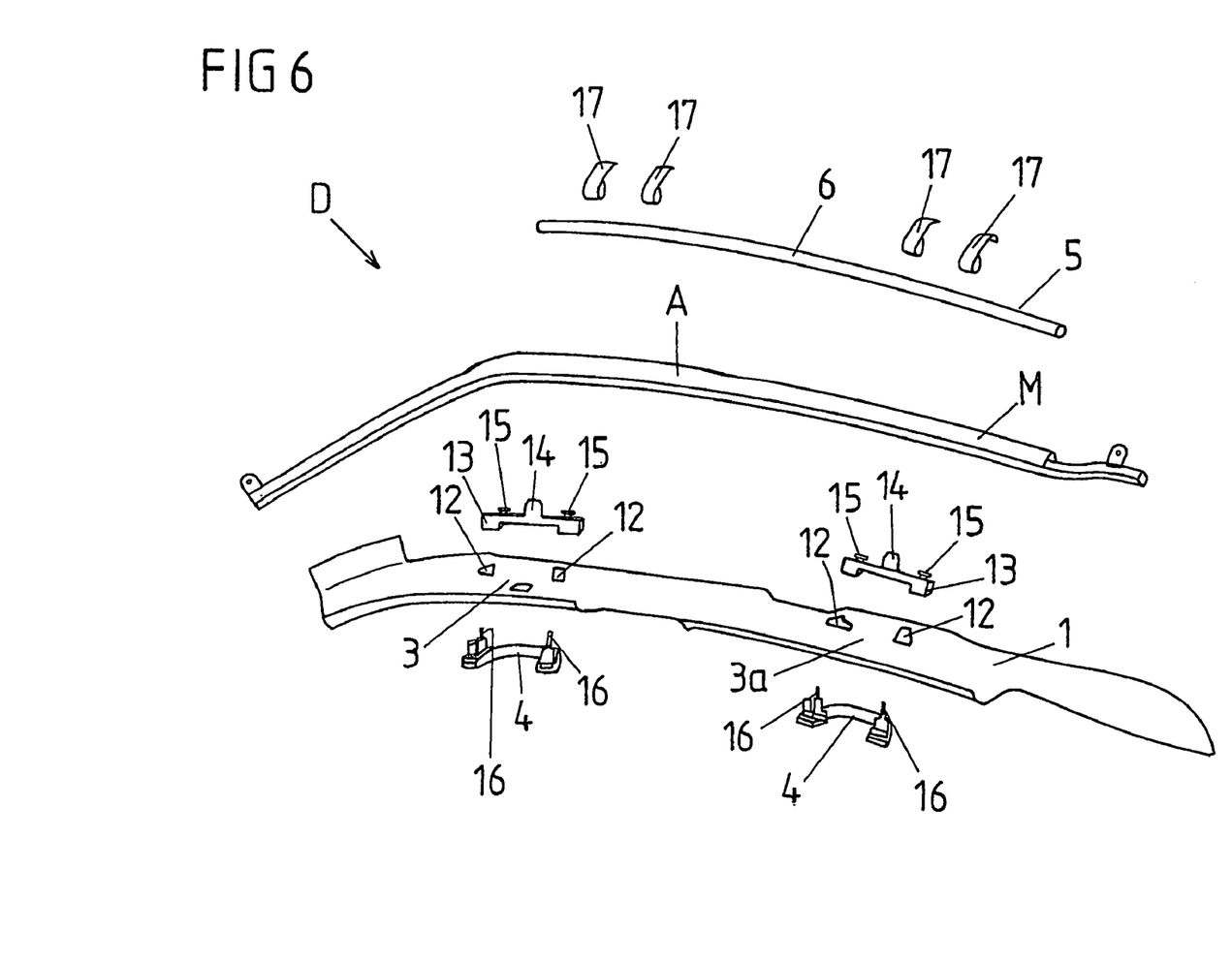
FIG. 6 is an exploded view of a roof-lining module.

FIG. 1B shows, in conjunction with FIG. 6, a perspective view of a cutout of a roof-lining covering 1 (as part of a roof-lining module D) of the type described in FIG. 1A with an edge 2a extending in a direction oriented parallel to the vehicle longitudinal axis X. Arranged along the edge 2a of the roof-lining covering 1 is a longitudinally extending module casing M of an airbag module A which has, on a free, first end region 7 which, in the fitted state of the roof-lining module D, is bent down in a direction pointing towards the vehicle floor, a first module end 9. The first module end 9 is bent down in the direction of the vehicle floor, together with a first fastening element 10. The first fastening element 10 protrudes from the first module end 9, and is of planar, rectangular design in a plane of extent and has a plug-through hole with a plug-through direction running perpendicularly to the plane of extension, through which, for example, a screw or a bolt can be plugged in order to fasten the first module end 9 to the motor vehicle. In this case, the plane of extension of the first fastening element 10 lies essentially in a plane running perpendicular to the vehicle floor and parallel to the vehicle longitudinal axis. A second fastening element 10a identical to the first fastening element 10 is formed at a second module end 9a which runs essentially along the edge 2a.

The module casing M of the airbag module A serves to receive a gas lance 5 of the type known from FIGS. 1A and 1B, in which a gas generator 6 (shown in FIG. 8A), extending longitudinally, is arranged along the edge 2a, as illustrated in FIG. 1A, and a gas bag 11 which, in the folded state, is arranged along the gas lance 5 and is not shown in FIG. 1B.

Two fastening regions 3 and 3a of the roof-lining covering 1 are spaced apart from each other and are of essentially rectangular design. The two essentially rectangular fastening regions 3 and 3a are formed along the edge 2a of the roof-lining covering 1, so that, in a fitted state of the roof-lining module D, in which the edge 2a runs adjacent to a roof frame R (shown in FIGS. 2B and 4) of the motor vehicle. In particular along the roof frame R, the airbag module A (and therefore the module casing M) is arranged between the fastening regions 3 and 3a and the roof frame R.

The fastening regions 3 and 3a have in each case two holes 12 which are spaced apart from each other, or put another way, the roof-lining covering 1 has in each case two continuous holes 12 which are spaced apart from each other within the fastening regions 3 and 3a. An essentially elongated, rectangular fastening limb 13 is placed in each case onto the fastening regions 3 and 3a, from which a first plug-in body 14, which is arranged centrally and is of planar and rectangular design in a plane of extension, protrudes in a direction oriented essentially perpendicularly to the vehicle floor and pointing towards the roof skin of the motor vehicle. In this case, the plane of extension of the first plug-in body 14 runs essentially parallel to the vehicle longitudinal axis X and perpendicularly to the vehicle floor in a state of a fastening limb 13 in which it is placed onto a fastening region 3 and 3a.

In each case on two free end sections which are spaced apart from each other, the fastening limbs 13 have cuboidal, second plug-in bodies 15 which, likewise in a fitted state of the roof-lining module D, protrude in a direction which is oriented essentially perpendicularly to the vehicle floor and points towards the roof skin of the motor vehicle. The first plug-in body 14 of a fastening limb 13 is therefore arranged between the two second plug-in bodies 15 of a fastening limb 13. On a side facing away from the second plug-in bodies 15, a fastening limb 13 has in each case two recesses which are spaced apart from each other and which have a plug-in opening with a plug-in direction. The plug-in direction, in a fitted state of the roof-lining module D, is essentially perpendicular to the vehicle floor and pointing in the direction of the roof skin. The recesses run in each case in the plug-in direction through the fastening limb 13 and the second plug-in bodies 15 formed thereon. The plug-in openings of the fastening limbs 13 are arranged so that, in a state of a fastening limb 13 in which it is placed onto the fastening region 3 and 3a, two fastening bolts 16 which protrude from the free ends of a U-shaped roof grab handle 4 can be plugged, starting from a lower side of the roof-lining covering 1. The side of which faces the vehicle floor in the fitted state of the roof-lining module D, through the holes 12 into the recesses of the relevant fastening limb 13. In this case, the fastening bolts 16 can undergo a form-fitting or frictional connection with the recesses of the fastening limbs 13. The fastening limbs 13 and the fastening bolts 16 thereby form a first fastening means for securing the roof grab handles 4 on the roof-lining covering 1, as described above.

The airbag module A, which, in the fitted state, is arranged between the fastening limbs 13 and the roof frame R, is pre-fixed on the first fastening means, on the fastening limb 13, by four retaining elements 17. For this purpose, the retaining elements 17 have a closed loop which is formed in the manner of a band and, in a circumferential direction of the gas lance 5, surrounds the longitudinally extending gas lance 5 and the longitudinally extending gas generator 6 arranged therein. Furthermore, the retaining elements 17 have free ends which protrude in each case from the loops which are guided out of the module casing M (which encloses the gas lance 5 and the gas generator 6) through slot-shaped openings which are assigned to the loops and are arranged on a surface of the module casing M that, in the fitted state of the roof-lining module D, points towards the roof skin. The retaining elements 17 are arranged in each case in pairs adjacent to the fastening limbs 13, with a free end of a loop being secured in each case on a second plug-in body 15, and serve to pre-fix the airbag module A on the roof-lining covering 1.

Figures 3A, 3B:
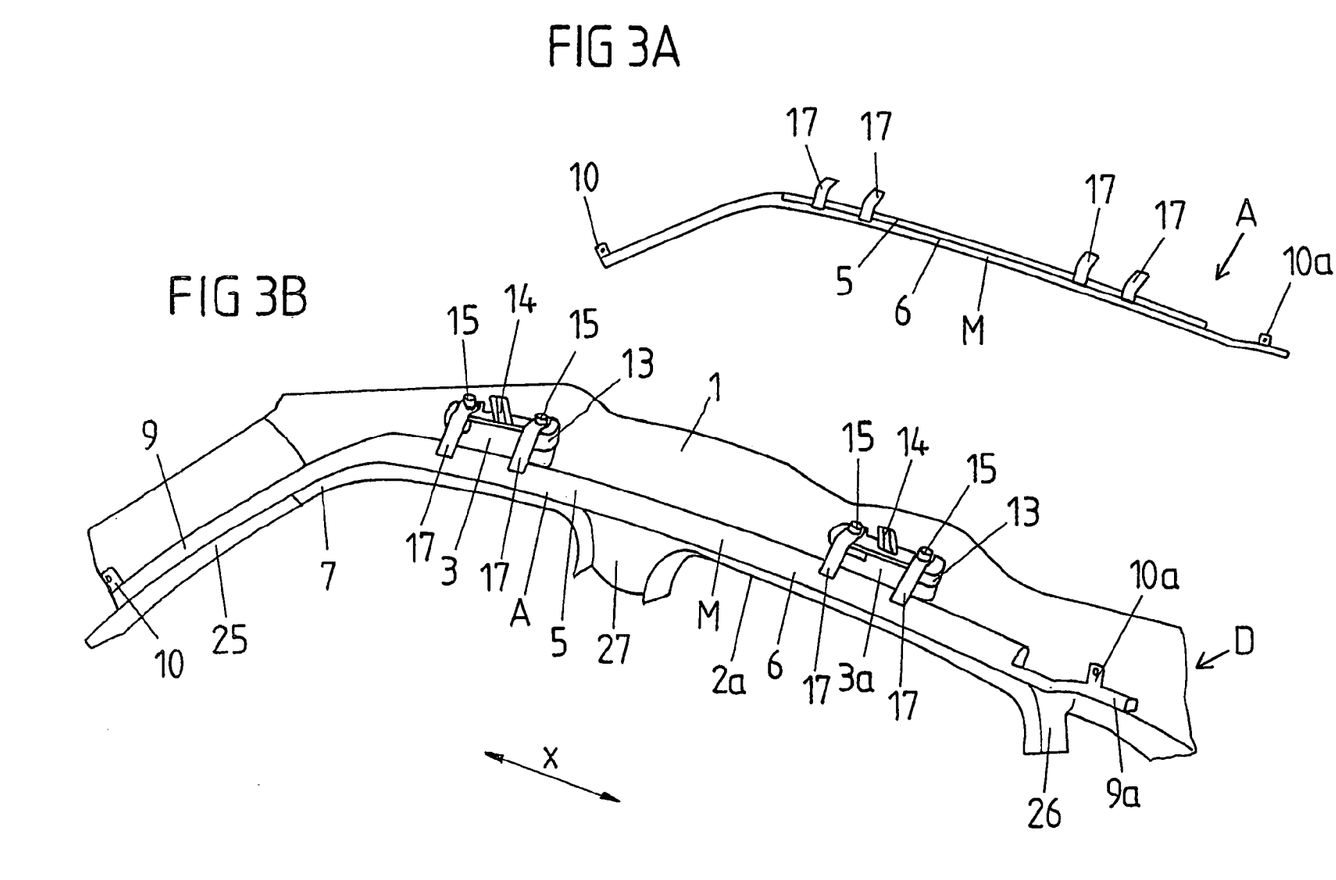
FIG. 3A is a perspective view of an airbag module with a longitudinally extending gas generator in a longitudinally extending gas lance.
FIG. 3B is a perspective view of a roof-lining module with details of the adjacent coverings of the A-, B-, and C-pillars of the motor vehicle.

FIG. 3A shows a diagrammatic view of an airbag module A of the type known from FIG. 1B, with, in contrast to FIG. 1B, a gas lance 5 being illustrated which is arranged, extending longitudinally, in the module casing M of the airbag module A and encloses a gas generator 6 (not shown) running, extending longitudinally, in the gas lance 5. An initiator of the gas generator 6 for initiating production of a flow medium to inflate a gas bag 11 may be arranged, for example, at one of the two ends of the longitudinally extending gas lance 5.

The loops, which surround the gas lance 5, of the retaining elements 17 are likewise shown. The retaining elements, as FIG. 1B shows, are arranged along a section of the module casing M which encases the gas lance 5 and the gas generator 6. The gas lance 5 and the gas generator 6 extend along an entire section of the module casing M, which, in a fitted state of the airbag module A, as shown in FIG. 1B, is extended along the edge 2a of the roof-lining covering 1.

Figure 2A:
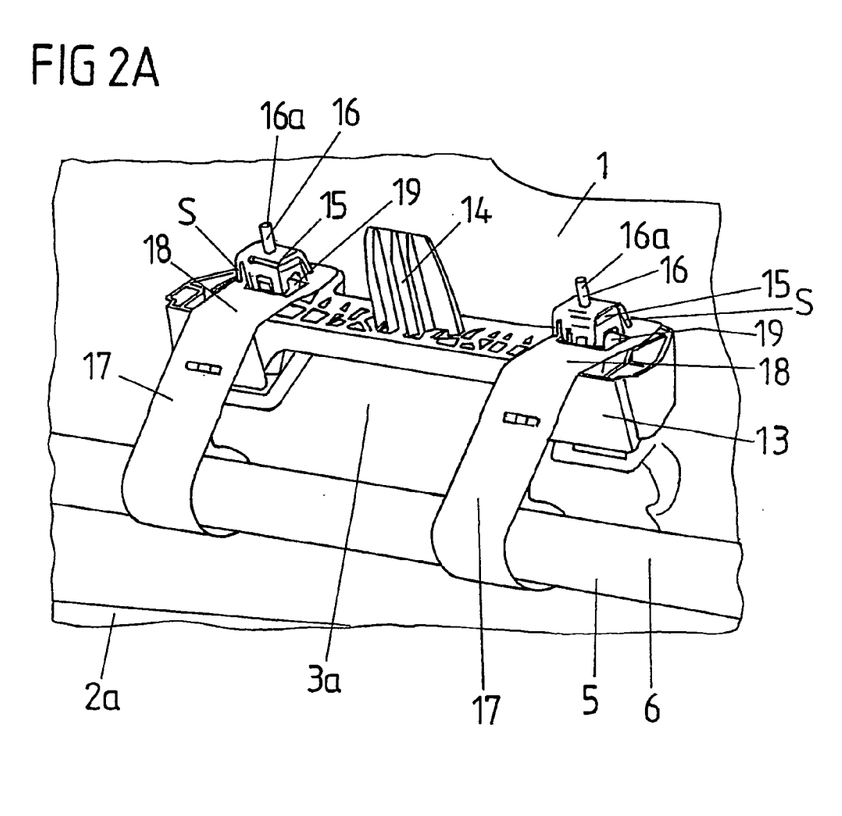
FIG. 2A is a perspective view of a gas lance secured on a fastening means for a roof grab handle.

FIG. 2A shows an enlarged, perspective, cutout view of a fastening limb 13 of the type described in FIG. 1B and FIG. 6 which is arranged on a fastening region 3a of the roof-lining covering 1 along an edge 2a of a roof-lining covering 1 of the type known from FIG. 1A and FIG. 1B. A gas lance 5 extending longitudinally runs parallel to the fastening limb 13, encloses a gas generator 6 arranged therein and has a circular cross section. In a fitted state of the roof-lining module D, the gas lance 5 is arranged between the fastening limb 13 and a roof frame R (not shown) and is secured on the fastening limb 13 by two retaining elements 17 which each have a loop surrounding the gas lance 5 in the circumferential direction of the gas lance 5. For this purpose, a respective planar, free end 18 protrudes from the two loops in a direction which runs perpendicularly to a direction of extension of the gas lance 5 in a plane which runs essentially parallel to a plane of extension of the roof-lining covering 1. The two free ends 18 of the two loops each have a square clearance 19, so that an opening is formed at the free ends 18, by means of which the free ends 18 are placed onto a respective plug-in body 15 of essentially cuboidal design. In this case, the two plug-in bodies 15 are formed on the fastening limb 13 in accordance with the embodiment described in FIG. 1B.

The two second plug-in bodies 15, which are of essentially cuboidal design, have bent-up sections S in each case on sides which face a rim of the clearances 19, the sections for which form latching means, so that the free ends 18 which are placed onto the second plug-in bodies 15 snap into position and are therefore secured on the fastening limb 13. Securing the gas lance 5 and therefore the airbag module A in this way serves to pre-fix the airbag module A on the roof-lining covering 1 in a pre-installation state of the roof-lining module D.

Starting from a lower side of the roof-lining covering 1, the side of which (not illustrated) faces the vehicle floor in the fitted state of the roof-lining covering 1 (and of the roof-lining module D), a roof grab handle 4 (not shown) according to the type known from FIGS. 1B and 6 is placed in the fastening limbs 13 by its fastening bolts 16 and is therefore fastened. In this connection, the fastening bolts 16 of the roof grab handles 4 each have a free end section 16a, the end sections of which are placed through the recesses of the fastening limbs 13 in the plug-in direction, as described with reference to FIGS. 1B and 6. The recesses are created and provided for the plugging-in process, and therefore protrude from the second plug-in bodies 15 of the fastening limb 13 in the plug-in direction.

Figure 4:
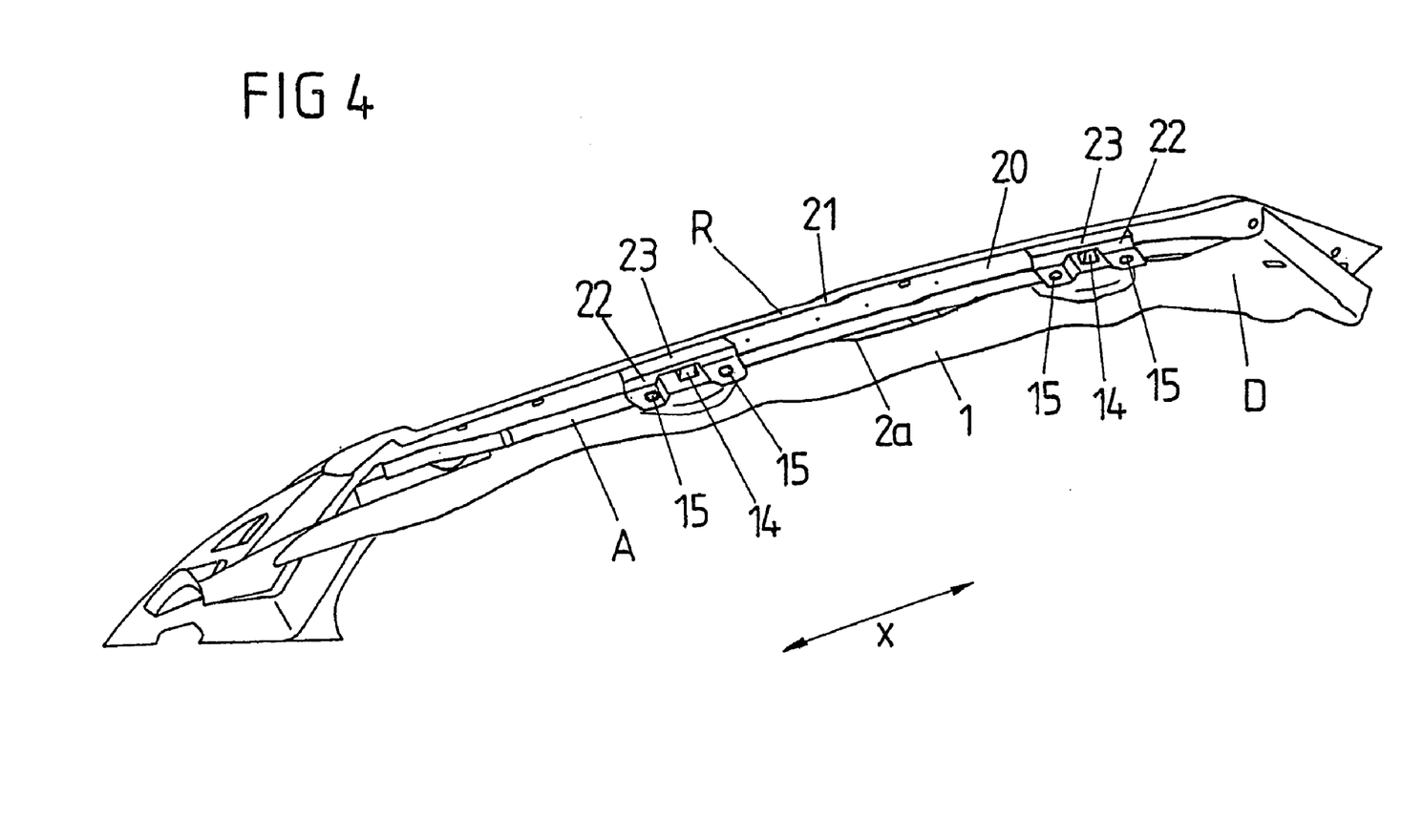
FIG. 4 is a perspective view of a roof-lining module secured on a roof frame of a motor vehicle.

FIG. 4 shows a longitudinally extending roof frame R (illustrated perspectively) of a motor vehicle with a direction of longitudinal extension which is oriented parallel to the vehicle longitudinal axis X. On the roof frame, a roof-lining module D of the type known from FIG. 1B is secured together with an airbag module A and a roof-lining covering 1. The roof frame R has an essentially L-shaped cross section in a plane perpendicular to the direction of longitudinal extension and accordingly has two limbs of planar design which lead off at right angles from each other, namely a first limb 20, which lies essentially in a plane of extension which is perpendicular to the vehicle floor and runs parallel to the vehicle longitudinal axis X, and a second limb 21, which lies in a plane of extension running parallel to the vehicle floor.

Fastening profiles 22 are spaced apart from each other, are essentially L-shaped in cross section, and are secured on the second limb 21 of the roof frame R as part of the roof frame R. Each fastening profile has a final fixing limb 23, which is of essentially planar and rectangular design and runs essentially parallel to the plane of extension of the second limb 21, and protrudes from the second limb 21 of the roof frame R in a direction pointing to an opposite, second roof frame (not illustrated). In this case, the spacing between the two final fixing limbs 23 along the second limb 21 corresponds to the spacing of the roof grab handles 4 (not illustrated) of the type known from FIGS. 1B and 6, which are fastened to the roof-lining covering 1 along an edge 2a of the roof-lining covering 1. In this case, the edge 2a of the roof-lining covering runs along the roof frame R below the second limb 21.

The two final fixing limbs 23 each have three recesses with a respective plug-in opening having a plug-in direction which is perpendicular to the final fixing limbs 23 and points towards the roof skin of the motor vehicle. The first and second plug-in bodies 14 and 15 of the type known from FIGS. 1B, 6 and 2A can be plugged into the plug-in openings of the final fixing limbs 23 in the plug-in direction. In this manner, a final fixing of the roof grab handles 4 of the type known from FIGS. 1B and 6 on the final fixing limbs 23 of the roof frame R is obtained. The airbag module A runs along the roof frame R below the second limb 21, is pre-fixed on the fastening limbs 13 of the roof grab handles 4 by the retaining elements 17, and is therefore also, as described in FIGS. 1B and 2A, secured in a finally fixed manner, i.e. ready for operation, on the roof frame R by the first and the second plug-in bodies 14 and 15 which form a second fastening means with the associated plug-in openings on the final fixing limbs 23.

Figure 2B:
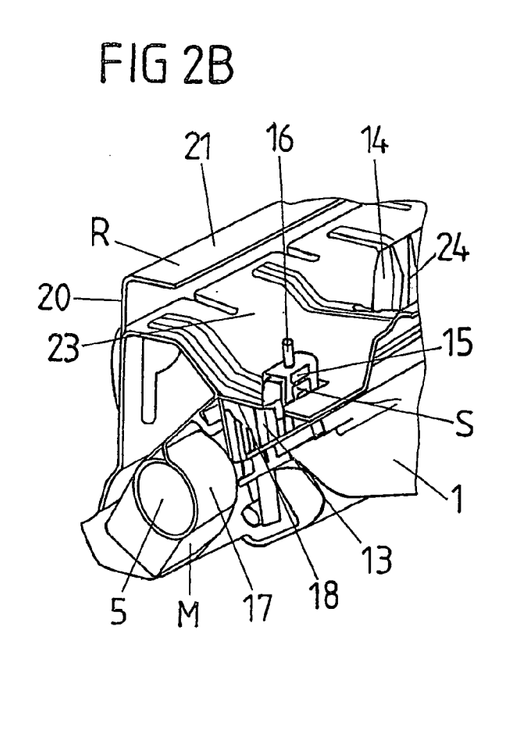
FIG. 2B is a perspective sectional view of a fastening means for a roof grab handle and for an airbag module which is secured on a roof frame.

FIG. 2B shows a perspective sectional cutout view of the final fixing limb 23 which is shown in FIG. 4 and which has the recesses known from FIG. 4 with a plug-in opening into which the first and the second plug-in bodies 14 and 15 can be plugged in the plug-in direction. In this case, those bent-up sections S of the second plug-in bodies 15 which are illustrated in FIG. 2A in turn form latching means which ensure that the second plug-in bodies 15 remain in the associated recesses of the final fixing limbs 23. The retaining elements 17 and therefore the gas lance 5 and the entire airbag module A are also "finally fixed" on the roof frame by the second plug-in bodies 15, cf. FIG. 2a, too.

The first plug-in body 14, which is illustrated in FIG. 2B, has ribs 24 which protrude vertically from its surface, run in the plug-in direction and taper, by means of which, for example, a frictional connection between first plug-in bodies 14 and the associated recess of the final fixing limb 23 can be obtained. If the first and second plug-in bodies 14 and 15 are plugged into the associated recesses of the final fixing limb 23, a free end 18, which is known from FIG. 2A, protrudes from the loop of the retaining element 17 and is secured, as illustrated in FIG. 2A, on the fastening limb 13, and runs between the fastening limb 13, which is secured on a lower side of the final fixing limb 23, the side of which faces the vehicle floor, and the lower side of the final fixing limb 23.

FIG. 3B shows the roof-lining module D known from FIG. 1B, with, in contrast to FIG. 1B, the first corner region 7 of the roof-lining covering 1 being adjoined by a first covering 25 of a C-pillar of the motor vehicle. The first covering 25 runs along the first module end 9 of the airbag module A. Furthermore shown in contrast to FIG. 1B is a second covering 26 of an A-pillar. The second covering 26 leads off at the second module end 9a from the roof-lining covering 1 in the direction of the vehicle floor, and a third covering 27 of a B-pillar. The third covering 27 leads off centrally between the two fastening limbs 13 from the edge 2a of the roof-lining covering 1. The first covering 25 serves both to cover the C-pillar and to cover the first module end 9. After a final fixing of the airbag module A has taken place, the module ends 9 and 9a can be fastened to the body of the motor vehicle by the first and second fastening elements 10 and 10a, which are already illustrated in FIG. 1B and which protrude from the first and the second module end 9 and 9a, respectively. Because the first module end 9 protruding from the roof-lining covering 1 is flexible, in the case of a flexible module covering M, it can be folded onto the roof-lining covering 1 in a pre-installation state and, in particular, can be fixed releasably on the roof-lining covering 1, so that the first module end 9 is not damaged during the transportation of the roof-lining module D.

Figure 5:
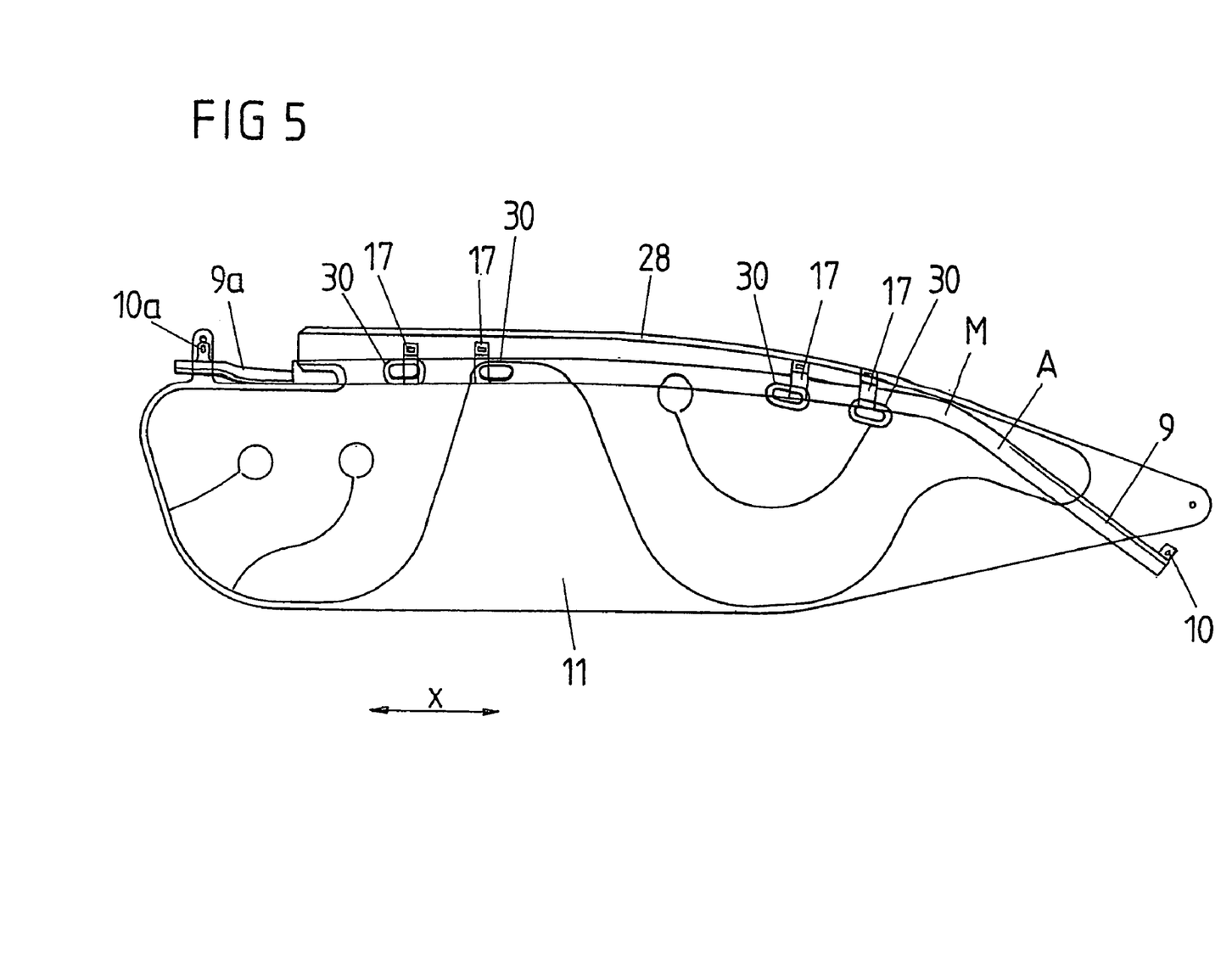
FIG. 5 is a front view of a gas bag of an airbag module.

FIG. 5 shows a diagrammatic view of a deployed gas bag 11 which has been emptied of flow medium, with a plane of extension lying in the plane of the paper. The gas bag 11 is formed in a manner known per se. It may have—as illustrated in FIG. 5—a plurality of chambers which are each assigned discharge openings in the gas lance 5.

Along its gas-bag edge 28 which is adjacent to the module casing M, the gas bag 11 has four slot-like, first cutouts 30 through which the closed loops of the retaining elements 17 of the type known from FIGS. 1B and 2A, the loops of which run around the gas lance 5 and a region of the gas bag 11 resting thereon, are guided. The loops are securable, as shown in FIG. 2A, on the fastening limbs 13 in order to pre-fix the airbag module A by free ends 18 protruding from the loops. Furthermore, the gas bag 11 has the already mentioned (first and second) fastening elements 10 and 10a at its ends.

Figure 7:
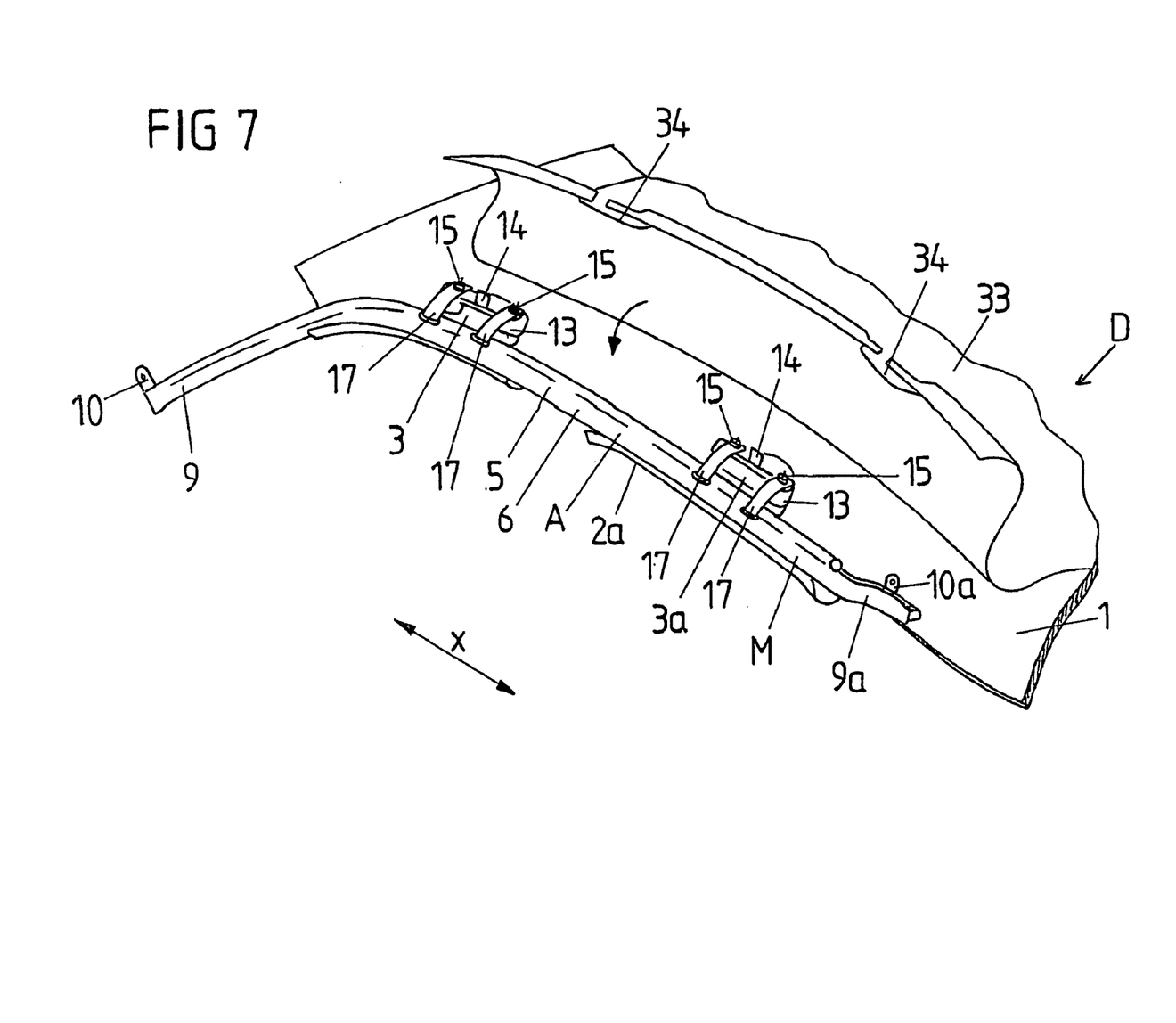
FIG. 7 is a perspective view of a roof-lining module with a protective covering of the roof-lining covering folded upwards.

FIG. 7 shows a roof-lining module D of the type described in FIG. 1B, with, in contrast to FIG. 1B, an additional, flexible protective covering 33 being fitted onto the roof-lining covering 1 and, in a fitted state of the roof-lining module D, being arranged between the roof-lining covering 1 and the roof skin of the motor vehicle. The protective covering 33 is illustrated as being folded upwards from the edge 2a in the direction of the roof skin of the motor vehicle (not illustrated). The protective covering 33 is shaped so that, with the protective covering 33, an entire outer surface of the roof-lining covering 1, the surface of which faces the roof skin of the motor vehicle in a fitted state of the roof-lining module D, can be covered congruently. The protective covering 33 furthermore has essentially two rectangular second cutouts 34 on an edge which, in a state of the protective covering 33 in which it is fully placed onto the roof-lining covering 1, rests on the edge 2a, with the result that the fastening limbs 13 are not covered by the protective covering 33 placed fully thereon.

Figures 8, 8A:
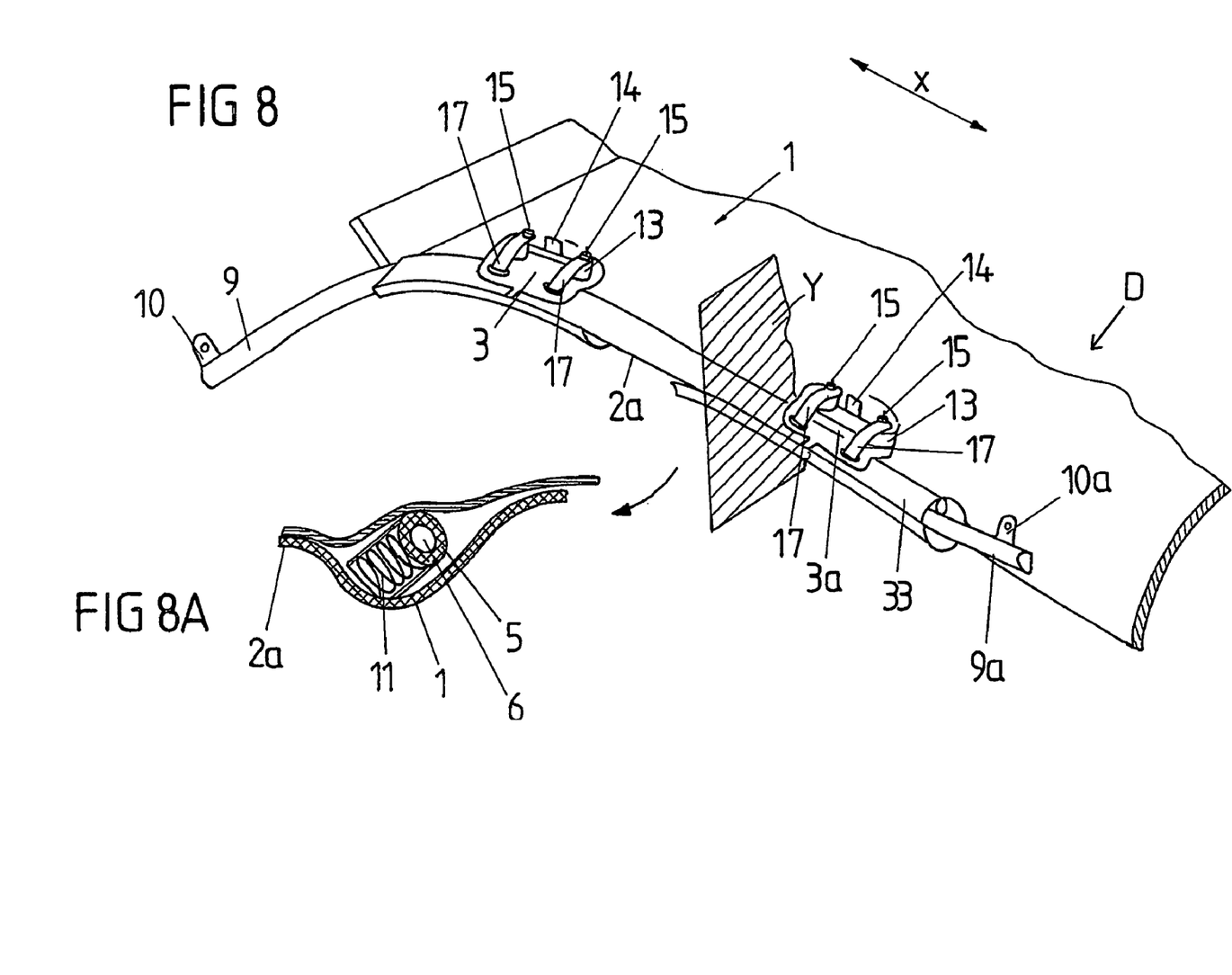
FIG. 8 is a perspective view of a roof-lining module with a protective covering fitted on a roof-lining covering.
FIG. 8A is a sectional view of a part of the roof-lining covering of FIG. 8 with a fitted protective covering and an airbag module arranged between the roof-lining covering and protective covering.

FIG. 8 shows the roof-lining module D known from FIG. 7 with the difference that, in FIG. 8, the protective covering 33 is arranged completely on the outer surface of the roof-lining covering 1, the surface of which faces the roof skin of the motor vehicle in the fitted state of the roof-lining module, and is fastened there. The protective covering 33 covers the airbag module A.

FIG. 8A shows a sectional illustration, by way of a cutout, of the roof-lining module D known from FIG. 8, the section plane Y being perpendicular to the roof-lining covering 1 between the two fastening limbs 13 and running perpendicular to the vehicle longitudinal axis X. The protective covering 33 together with the roof-lining covering 1 forms a protective casing, which runs, extending longitudinally, along the edge 2a, in order to receive the longitudinal extending airbag module A which has a gas lance 5, which is of circular design in cross section in the sectional illustration, and a gas generator 6 extending therein along the edge 2a. The gas lance 5 is enclosed by a gas bag 11 which, folded to form a gas-bag package, is arranged essentially below the gas lance 5 and adjacent to the gas lance 5, i.e., in the one fitted state of the roof-lining module D, the gas bag 11, which is folded to form a gas-bag package, is arranged between the gas lance 5 and vehicle floor (not illustrated). The airbag module A is additionally protected by the additional protective covering 33 connected to the roof-lining covering D, so that a module casing M of the airbag module can be omitted.

Given the disclosure of the specification and drawings, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A roof-lining module for installation in a motor vehicle, comprising:
 a roof-lining covering for covering an inside of a motor vehicle roof skin, wherein a side of the roof-lining covering faces a vehicle floor;
 an airbag module secured on the roof-lining covering, wherein the airbag module includes a gas generator, wherein the gas generator extends longitudinally over at least a partial region of the roof-lining covering;
 a gas lance connected to the gas generator, wherein the gas lance is designed such that the gas lance extends longitudinally along a vehicle longitudinal axis, and is part of the airbag module; and
 at least one retaining element having at least one loop which encircles the gas lance in a circumferential direction of the gas lance in order to secure the airbag module to the roof-lining covering; and
 wherein the airbag module includes a gas bag, and wherein the gas bag surrounds the gas lance.

2. The roof-lining module according to claim 1, wherein the gas generator extends longitudinally along an edge of the roof-lining covering.

3. The roof-lining module according to claim 2, wherein, in an installation state of the roof-lining module, the edge of the roof-lining covering runs essentially parallel to the vehicle longitudinal axis.

4. The roof-lining module according to claim 1, wherein the gas generator is arranged in the gas lance such that the gas lance encases the gas generator.

5. The roof-lining module according to claim 1, wherein at least one roof grab handle is secured along an edge of the roof-lining covering, and wherein the airbag module is pre-fixed on the roof grab handle.

6. The roof-lining module according to claim 5, wherein the airbag module is fastened to a roof frame of the motor vehicle by the roof grab handle being fastened to the roof frame.

7. The roof-lining module according to claim 6, wherein the roof grab handle is fastened to at least one fastening region of the roof-lining covering by a first fastening means.

8. The roof-lining module according to claim 7, wherein the airbag module is pre-fixed on the at least one fastening region by the at least one retaining element, the first fastening means, or a combination thereof in a pre-installation state of the roof-lining module.

9. The roof-lining module according to claim 8, wherein the gas generator is arranged in the gas lance such that the gas lance encases the gas generator.

10. The roof-lining module according to claim 9, wherein the loop or a free end protruding from the loop is fastened to the fastening region, the first fastening means, or a combination thereof.

11. The roof-lining module according to claim 8, wherein, in a region adjacent to the gas lance, the gas bag has at least one cutout through which the at least one loop encircling the gas lance in the circumferential direction of the gas lance runs.

12. The roof-lining module according to claim 7, wherein the roof-lining covering is fastened to the roof frame of the motor vehicle in an installation state of the roof-lining module by a second fastening means, and wherein the second fastening means is arranged onto the first fastening means.

13. The roof-lining module according to claim 12, wherein the second fastening means is formed by regions which protrude from the first fastening means, the retaining element, or a combination thereof and is configured to be plugged into recesses of the roof frame in order to form a connection between the roof-lining module and the roof frame.

14. The roof-lining module according to claim 1, wherein the airbag module has at least one module end which protrudes from the roof-lining covering.

15. The roof-lining module according to claim 14, wherein the at least one module end is secured on a body of the motor vehicle in an installation state of the roof-lining module.

16. The roof-lining module according to claim 14, wherein, in a pre-installation state of the roof-lining module, the at least one module end is folded onto the roof-lining covering and is configured to be fixed releasably on the roof-lining covering for transportation of the roof-lining module.

17. The roof-lining module according to claim 14, wherein the roof-lining covering together with a protective covering as part of the roof-lining module forms a casing for receiving the airbag module, and wherein the protective covering is connected to the roof-lining covering.

18. The roof-lining module according to claim 1, wherein the loop encircles the gas lance in the circumferential direction of the gas lance and attaches to the roof-lining covering such that the airbag module is secured to the roof-lining covering via the loop.

19. The roof-lining module according to claim 1, wherein a roof grab handle is fastened to at least one fastening region of the roof-lining covering by a fastener, and wherein the loop or a free end protruding from the loop is fastened to the fastening region, the fastener, or a combination thereof.

\* \* \* \* \*